United States Patent
Corbin

(10) Patent No.: US 7,568,665 B2
(45) Date of Patent: Aug. 4, 2009

(54) STAND OFF TIE FOR COMMUNICATIONS CABLES

(76) Inventor: O. Bradley Corbin, 711004 Canterbury Ct., St. Charles, IL (US) 60175

( * ) Notice: Subject to any disclaimer, the term of this patent is extended or adjusted under 35 U.S.C. 154(b) by 0 days.

(21) Appl. No.: 11/686,605

(22) Filed: Mar. 15, 2007

(65) Prior Publication Data

US 2008/0223995 A1 Sep. 18, 2008

(51) Int. Cl.
*F16L 3/12* (2006.01)
(52) U.S. Cl. .......... 248/74.3; 248/71; 248/547
(58) Field of Classification Search ...... 248/74.1–74.3, 248/74.5, 68.1, 71, 547; 24/16 R, 16 PB; 174/4 R
See application file for complete search history.

(56) References Cited

U.S. PATENT DOCUMENTS

| | | | |
|---|---|---|---|
| 3,054,585 A | | 9/1962 | Roberts et al. |
| 3,149,808 A | * | 9/1964 | Weckesser ............... 248/74.3 |
| 3,584,525 A | * | 6/1971 | Caveney et al. ............ 81/488 |
| 3,632,070 A | * | 1/1972 | Thayer ..................... 248/68.1 |
| 3,966,154 A | * | 6/1976 | Perrault et al. ............... 248/62 |
| 4,127,250 A | * | 11/1978 | Swick ......................... 248/71 |
| 4,728,064 A | * | 3/1988 | Caveney ................... 248/74.3 |
| 4,805,856 A | | 2/1989 | Nicoli et al. |
| 5,042,114 A | * | 8/1991 | Parrish ..................... 24/16 PB |
| 5,598,994 A | | 2/1997 | Olewinski et al. |
| 6,355,887 B1 | | 3/2002 | Gretz |
| 6,592,083 B1 | | 7/2003 | Hobson et al. |
| 6,651,945 B2 | * | 11/2003 | Rivellino et al. ......... 248/206.5 |
| 7,083,152 B2 | * | 8/2006 | Carullo et al. ............... 248/65 |
| 7,150,437 B1 | * | 12/2006 | Teeters ....................... 248/70 |
| 2003/0222184 A1 | * | 12/2003 | Geiger ......................... 248/65 |
| 2004/0251392 A1 | | 12/2004 | Franks, Jr. |
| 2005/0178580 A1 | | 8/2005 | Holland et al. |
| 2006/0179783 A1 | * | 8/2006 | Hay et al. .................... 52/698 |

* cited by examiner

*Primary Examiner*—Korie Chan
(74) *Attorney, Agent, or Firm*—Thomas, Kayden, Horstemeyer & Risley, LLP

(57) ABSTRACT

The stand off tie includes a mounting block (14) having a mounting surface (20) that engages the facing surface of a stud of a building structure. A fastener (18), such as a nail or screw, is driven through a fastener opening (26) into the stud. A strap opening (30) receives a tie strap (16) and the tie strap is fastened about one or a bundle of communications cables (40).

9 Claims, 2 Drawing Sheets

STAND OFF TIE FOR COMMUNICATIONS CABLES

FIELD OF THE INVENTION

This invention concerns a stand off tie that suspends communication cables in spaced relationship to the structural surface of a building structure.

In recent years communication cables have been installed in building structures to accommodate computers, television, sound systems, home theaters and other electronic devices. Typically, the communications cables are drawn vertically, either up through the floor or down through the ceiling structure, between adjacent studs in a hollow wall. Also, the cables may be drawn horizontally between or through joists in the floors or attics. When the cables reach the desired positions in the wall, etc., the cables are then turned to move through an opening in the external paneling of the wall so as to enter the room at the position of the communications device.

Typically, communications cables need support from a wall stud or other surface in the hollow wall and/or from the horizontally extending supports such as the joists of the building as the cables extend toward the opening in the wall paneling. The common practice was to apply a clip or other connector to each communications cable and fasten the clip to a stud, joist, etc. with the communications cables in abutment with the stud, etc. Also, a typical sound system requires several communication cables to lead to and from the amplifier, and it is desirable to support each cable along its length as it extends from the amplifier to its speaker, etc.

There are installation problems that accompany the prior art procedure. For example, the installer must have the clips available and the screws or nails that are used with the clips, align the communications cable on the wall, and then align the nails or screws with the clips and hammer or screw the clips about the cable to the stud. In situations where the support for the communications cable is high or low with respect to the installer, the mounting of the clips is more difficult, causing stress on the installer, and possibly causing the installer to mount the clips at a position convenient to the installer instead of at the most desirable position for the communication cable. In situations where there are several cables in a bundle of cables that require support, the installer must install multiple clips to support the bundle of cables.

Also, the mounting of communications cables directly to a vertical stud or other structural support places the communications cables immediately adjacent the surface of the support. Should any sheetrock nail or other screw or nail or any penetration of the wall such as a drill miss the target when aimed at a stud, etc. there is some hazard that the nail, screw, etc. will engage the communications cable, causing a defect in the cable.

Also, the mounting of a communications cable with a clip sometimes forms bends in the cable, negatively affecting the performance of the cable.

The current invention helps to avoid the foregoing problems and presents an easy to use, highly effective stand off tie for suspending and supporting communications cable from structural supports such as within a hollow wall and/or ceiling.

SUMMARY OF THE INVENTION

Briefly described, the present invention comprises a stand off tie for communications cable for tying cables to a structural surface of a building. In one embodiment the stand off tie includes a mounting block, a tie strap and a fastener. The mounting block has a mounting surface for engagement with a structural surface of the building and a rear surface opposed to said mounting surface. The mounting block defines an open ended fastener opening having a length extending from the mounting surface to the rear surface, the fastener opening sized and shaped to receive a fastener. A fastener extends through the fastener opening and has an end at the mounting surface for connection to the building structure and a driving head at the rear surface.

The mounting block defines a strap opening, and the tie strap includes opposed ends and a connector at one of the opposed ends for connecting the tie strap about a communications cable. The tie strap is drawn partially through the strap opening for wrapping about one or more communications cables and for suspending the communications cables away from the structural surface of the building. The elements of the stand off tie are assembled and packaged when they are received by the cable installer for immediate use by the installer without having to assemble the parts at the work site.

Another embodiment of the invention includes a stand off tie that has a mounting block with a mounting surface for substantially flat engagement with a flat structural surface of the building structure and a stem extending away from the engagement surface. The stem defines a fastener opening having a length extending therethrough from the mounting surface of the stem to the rear surface of the stem for receiving a rectilinear fastener, such as a nail or a screw.

The fastener extends through the fastener opening having a penetrating, sharpened end for connection to the building structure, and a driving head for placement outside the opening of the stem. When the mounting surface is placed in engagement with the structural surface of the building, the head of the fastener is engaged by a hammer or by a screw driver or other tool so as to cause the distal sharpened end of the fastener to penetrate the structure and hold the mounting block to the structure.

The other end of the stem includes a laterally extending connector protrusion, extending laterally from the fastener opening. The strap holder protrusion is displaced laterally from the fastener opening.

The connector protrusion defines a strap opening. The strap opening has a length extending normal to the length of the fastener opening and a breadth corresponding to the breadth of the tie strap. The tie strap is drawn partially through the tie strap opening of the mounting block, and its free ends are available for wrapping about one or more communications cables with a connector, such as a buckle, an end of the tie strap for drawing the tie strap about the communications cables. This ties the tie strap around the communications cables, suspending the communications cables away from the stud or other vertical surface to which the mounting block has been mounted.

The parts of the invention may be pre-assembled, with a nail or screw extending through its fastener opening, with the nail or screw withdrawn so as not to protrude from the mounting surface of the mounting block, causing the distal end of the nail or screw and its head to be displaced from the mounting block. With this arrangement, the worker can conveniently place the mounting surface of the mounting block in abutment with the stud, etc., and use a hammer or a screw driver to cause the fastener to penetrate the stud, etc., firmly mounting the mounting block to the stud, etc. This is accomplished without having to join the cable to the stand off tie. Once the tie is fastened to the structure, the cables are moved toward the mounting block and the tie strap is wrapped about the cables and supports the cables.

The fastener used with the mounting block may be a conventional fastener, particularly a helically threaded screw with a head on its remote end, a nail having a sharpened end and a head at its distal end, or other types of fasteners that function to hold the mounting surface of the mounting block in firm engagement with the surface of a stud, joist, etc.

Moreover, the stand off tie will have its tie strap pre-mounted in the tie strap opening of the mounting block, so that when the worker drives the fastener into the stud, the tie strap is ready for being extended about a communications cable. Typically, the installer will have drawn the proper lengths of communications cables through the building structure that is necessary to fit the job. The installer will then move the cables laterally to the stand off tie and surround the cables with the tie strap and connect the ends of the tie strap together about the cables. This suspends the cables in the desired position, which is displaced from the stud, etc. of the building structure. In the situation where several cables are formed in a bundle, the tie strap may be used to support all of the cables in the bundle. The tie strap may be supplied in several lengths, such as in lengths of eight inches, eleven inches or even seventeen inches to support all of the communications cables in a bundle.

The pre-assembled condition of the stand off tie as received by the installer provides a convenience to the installer so that it is only necessary to lift the stand off tie from its container, place it in the desired position and drive the fastener of the stand off tie into the surface of the building structure. The fastener is rectilinear and extends through the mounting block and is oriented substantially perpendicular to said mounting surface. When the mounting surface is placed in engagement with the flat surface of the stud the fastener becomes substantially perpendicular to the stud and is ready for insertion into the stud without further effort.

This extremely simple installment method reduces the time required for installation of not only the stand off tie but also of the communications cables. Further, the strap of the stand off tie tends to more gently support the communications cables, typically reducing the sharpness of the bends in the cables with respect to the previously used fastener clips.

In the event that the stand off ties are being mounted to a building structure that has metal studs, the fastener can comprise a self tapping screw or other type of fastener that is compatible with the metal studs.

DETAILED DESCRIPTION

Figure 1:
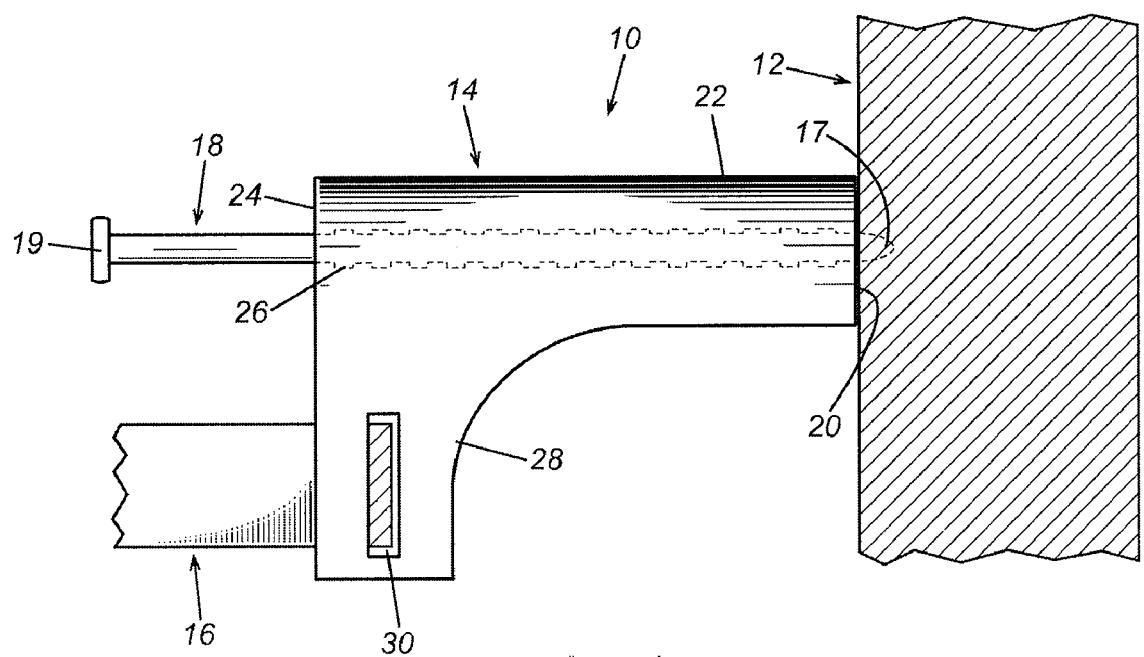
FIG. 1 is a side elevational view of the stand off tie as it is originally placed adjacent a vertical support such as a stud in a wall structure.

Referring now in more detail to the drawings, in which like numerals indicate like parts throughout the several views, FIG. 1 illustrates a stand off tie 10 that is to be mounted to a stud or other internal support 12 of a building structure. The expression "stud" as used herein is intended to include various other structural members in a building to which the tie may be mounted. The stand off tie includes a mounting block 14, a tie strap 16, and a fastener 18. The mounting block 14 may be formed of polyvinylchloride, and other materials strong enough to support the cables, and includes a mounting surface 20 that may be substantially flat and is for placement in flat abutment with the facing surface of the stud 12. A stem 22 extends from the mounting surface 20 and its rear surface 24 may be flat and parallel to the mounting surface 20, but can be of other shapes and angles as may be desired. The upper surface of the stem may be semi-cylindrical, flat, or other configurations.

A fastener opening 26 extends through the stem 22 from the rear surface 24 to the mounting surface 20, with the fastener opening 26 extending substantially perpendicular to the mounting surface 20. Preferably the fastener opening 26 is centered in the stem 22.

The fastener 18 is inserted through the fastener opening 26. Before the stand off tie is placed in use, the fastener is inserted only partway through the fastener opening, as illustrated in FIG. 1, with its sharpened end 17 either withdrawn from the mounting surface 20 or only slightly protruding therefrom.

The other end of the fastener 18 may include a head 19 that will engage the rear surface 24 of the mounting block when the fastener has been driven into the stud 12. Fasteners of other configurations may be used if desired.

The mounting block 14 includes a laterally extending tie strap support protrusion 28. The protrusion 28 is displaced from the fastener opening 26 and stem 22 and defines strap opening 30. Tie strap 16 extends through the strap opening 30. The strap opening is of a breadth that corresponds to the breadth of the strap 16 so that the strap can be slid through the strap opening but the strap opening tends to apply enough friction to the strap so as to maintain the strap in the strap opening.

Preferably the tie strap 30 is formed of a synthetic material such as polyvinylchloride or nylon or other material that has sufficient tensile strength to hold the communications cables and that is flexible to the extent that it can be bent into a circular shape and conform to the surface of the communications cables. For example, a buckle 32 or other connector may be mounted to one end of a tie strap, and the tie strap includes corrugations 34 that can engage a tang 36 of the buckle, with the tang holding the tie strap in the buckle. Other types of fasteners may be employed including but not limited to Velcro brand hook and loop fasteners, beaded ties, and plastic molded straps. The tie straps may be formed in different lengths for supporting different sizes of bundles of cables.

Figure 3:
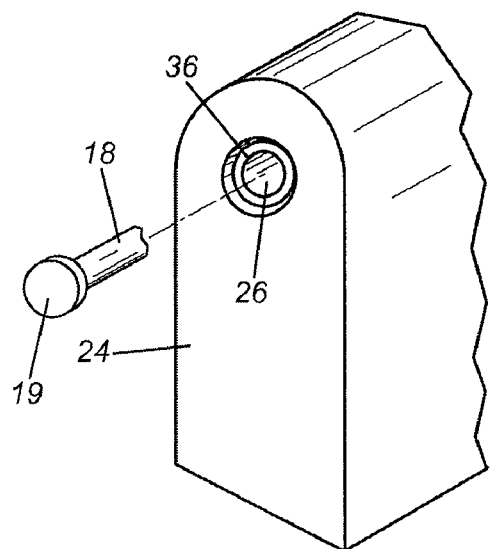
FIG. 3 shows a modification to the entrance of the fastener opening of the mounting block so that the fastener can be countersunk into the rear surface of the mounting block.

As shown in FIG. 3, the fastener opening 26 may be countersunk at 36 on the rear surface 24 of the mounting block so as to accommodate the head 19 of the fastener 18.

Figure 2:
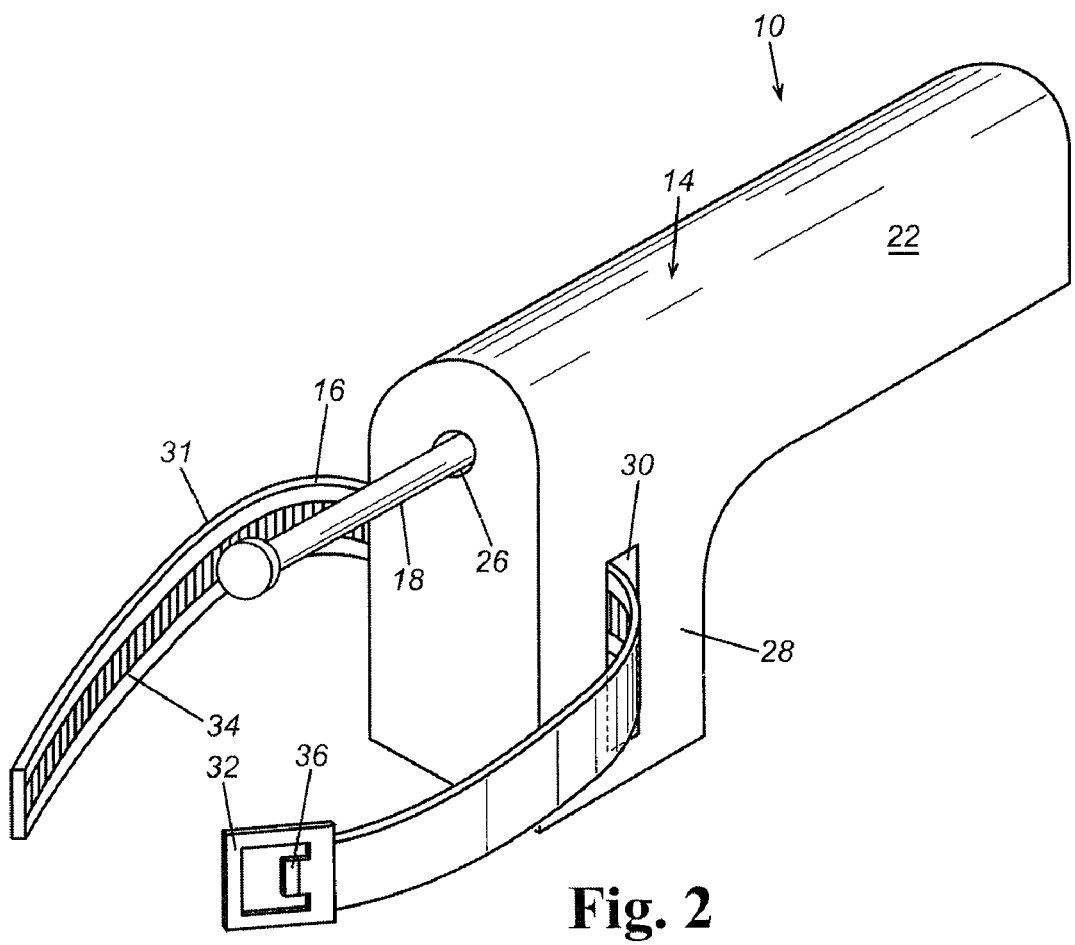
FIG. 2 is a perspective illustration of the stand off tie before it is installed.

The stand off tie usually is provided to the worker in the condition as shown in FIG. 2, with the strap 31 unbuckled and with the fastener 18 having its sharpened end 17 withdrawn into the fastener opening 26.

Figure 4:
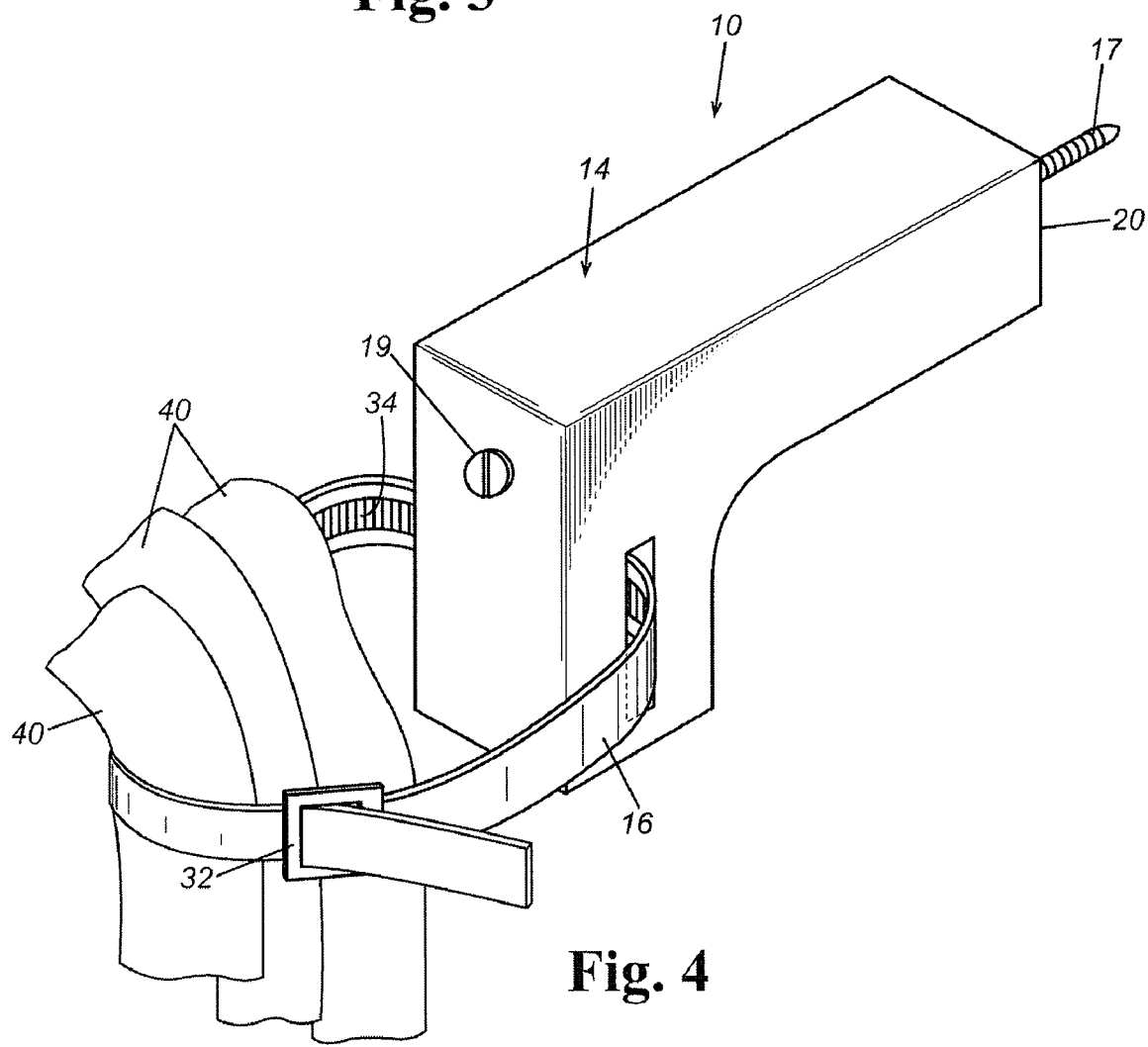
FIG. 4 is a perspective view of the stand off tie, similar to FIG. 2, but showing a different shape of the mounting block and how the tie strap is connected about and supports communications cables.

As shown in FIG. 4, the typical installation of the stand off tie 10 is to drive the fastener 18 into the stud 12 of the wall by engaging the head 19 with a driving tool such as a hammer or screwdriver. This causes the sharpened end 17 to penetrate the stud and urge the mounting surface 20 into engagement with the facing surface of the stud 12. This holds the stand off tie in the position as illustrated in FIG. 1. When the mounting surface 20 is placed in engagement with the flat surface of the stud 12 the fastener becomes substantially perpendicular to the stud and is ready for insertion into the stud without further effort.

Once the fastener has been driven into the stud 12, the strap is available in the correct position for holding communications cables, such as the bundle of cables 40 shown in FIG. 4. The worker moves the cables toward the stand off tie, then wraps the tie strap 16 about the cables, and connects the ends of the strap together. This supports the communications cables in a suspended arrangement with a soft connection by the tie strap away from the mounting block 14, displaced from the stud 12, away from the hazard of someone attempting to drive a nail through the sheetrock and into the stud 12, inadvertently engaging the communications cables.

The size of the mounting block 14, fastener 18, and tie strap 16 may be selected in sizes for proper support of larger and smaller bundles of cables.

Although preferred embodiments of the invention have been disclosed in detail herein, it will be obvious to those skilled in the art that variations and modifications of the disclosed embodiment can be made without departing from the spirit and scope of the invention as set forth in the following claims.

The invention claimed is:

1. A stand off tie for tying communications cables to a structural surface of a building with the communications cables displaced normally from the portion of the structural surface to which they are tied, comprising:
    a preassembled mounting block, a flexible tie strap and one fastener ready for mounting to the structural surface,
    said mounting block having a mounting surface for engagement with the structural surface of the building and a rear surface opposed to said mounting surface,
    said mounting block defining an open ended fastener opening having a length extending from said mounting surface to said rear surface, said fastener opening sized and shaped to receive and retain said fastener,
    said fastener extending through and retained in said fastener opening, said fastener having an end at said mounting surface for connection to the building structure and a driving head at said rear surface,
    said mounting block defining a strap opening positioned between said mounting surface and said rear surface, said strap opening extending substantially parallel to said rear surface, and
    said flexible tie strap being drawn partially through and retained in said strap opening for wrapping about communications cables and for suspending the communications cables adjacent said rear surface of said mounting block and away from the structural surface of the building to which they are tied.

2. The stand off tie of claim 1 wherein said tie strap is suspended below said fastener in a direction away from said mounting surface of said mounting block.

3. The stand off tie of claim 1, wherein said fastener is a nail.

4. The stand off tie of claim 1, wherein said fastener is a screw.

5. The stand off tie of claim 1, wherein said fastener is out of alignment with said tie strap.

6. The stand off tie of claim 1, wherein said fastener is longer than the said open ended fastener opening and said driving head extends beyond said rear surface of said mounting block and said end of the fastener is positioned at said mounting surface.

7. A stand off tie for tying communications cables to a structural surface of a building with the communications cables displaced from the structural surface of the building to which they are tied, comprising:
    a preassembled mounting block, flexible tie strap and fastener ready for attachment to the structural surface,
    said mounting block having a mounting surface for substantially flat engagement with the structural surface of the building and an opposed rear surface substantially parallel to said mounting surface,
    a fastener opening extending through said mounting block and having a length normal to said mounting surface and extending through said mounting surface and said rear surface,
    said mounting block defining a strap opening positioned between said mounting surface and said rear surface,
    a said flexible tie strap extending through said strap opening of said mounting block in a direction substantially parallel to said rear surface of said mounting block, said flexible tie strap positioned to gather communications cables toward engagement with said rear surface of said mounting block such that the communications cables to be supported by said flexible tie strap are displaced from the structural surface of the building,
    said flexible tie strap being of sufficient length to surround at least one communications cable and tie the communications cables to said mounting block at a position adjacent said rear surface of said mounting block and displaced from said mounting surface, and
    said fastener extending through said fastener opening and retained by said mounting block and including an end adjacent said mounting surface of said mounting block for attachment to the structural surface and a driving head positioned outside said mounting block for urging said end of said fastener into the structural surface.

8. The stand off tie of claim 7, wherein
    said strap opening is positioned remote from said mounting surface, and
    said flexible tie strap being drawn partially through said strap opening for wrapping about the communications cables and for suspending the communications cables displaced away from the structural surface of the building.

9. The stand off tie of claim 7, wherein said fastener is rectilinear and extends through said mounting block and is oriented substantially perpendicular to said mounting surface,
    such that when said mounting surface is placed in engagement with a support structure said fastener is also substantially perpendicular to the support structure and is ready for insertion in the support structure.

* * * * *